US007713119B2

(12) United States Patent
Pacey et al.

(10) Patent No.: US 7,713,119 B2
(45) Date of Patent: May 11, 2010

(54) WAGERING GAME HAVING RULE SET MODIFICATION

(75) Inventors: Larry J. Pacey, Northbrook, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 302 days.

(21) Appl. No.: 11/289,894

(22) Filed: Nov. 30, 2005

(65) Prior Publication Data

US 2006/0116194 A1 Jun. 1, 2006

Related U.S. Application Data

(60) Provisional application No. 60/632,238, filed on Dec. 1, 2004.

(51) Int. Cl.
*A63F 9/24* (2006.01)
*A63F 13/00* (2006.01)
*A63F 17/00* (2006.01)

(52) U.S. Cl. ............................ 463/20; 463/13; 463/16; 463/25; 273/138.2

(58) Field of Classification Search .................. 463/20, 463/13, 25, 16; 273/138.1
See application file for complete search history.

(56) References Cited

U.S. PATENT DOCUMENTS

| | | | | |
|---|---|---|---|---|
| 4,752,068 | A | 6/1988 | Endo | 273/1 E |
| 5,575,474 | A | 11/1996 | Rossides | 463/26 |
| 5,609,525 | A | 3/1997 | Ohno et al. | 463/43 |
| 5,833,537 | A | 11/1998 | Barrie | 463/21 |
| 5,957,775 | A | 9/1999 | Cherry | 463/16 |
| 6,004,211 | A | 12/1999 | Brenner et al. | 463/40 |
| 6,012,983 | A | 1/2000 | Walker et al. | 463/20 |
| 6,077,163 | A | 6/2000 | Walker et al. | 463/26 |
| 6,113,098 | A | 9/2000 | Adams | 273/143 R |
| 6,120,031 | A * | 9/2000 | Adams | 273/292 |
| 6,165,071 | A | 12/2000 | Weiss | 463/24 |
| 6,234,896 | B1 | 5/2001 | Walker et al. | 463/16 |
| 6,273,820 | B1 | 8/2001 | Haste, III | 463/40 |
| 6,319,127 | B1 | 11/2001 | Walker et al. | 463/26 |

(Continued)

FOREIGN PATENT DOCUMENTS

WO WO 99/29381 6/1999

*Primary Examiner*—Gene Kim
*Assistant Examiner*—Michael D Dennis
(74) *Attorney, Agent, or Firm*—Nixon Peabody LLP

(57) ABSTRACT

The present invention is directed to a gaming machine and a method of playing a wagering game having a basic set of rules for playing a wagering game. Under the basic set of rules, a player can accumulate and save assets that are associated with the wagering game. In addition to the basic set of rules, the wagering game includes modifiers to the basic set of rules that modify the assets, enhance the assets or provide new assets. These modifiers may, for example, multiply an award associated with an asset or group of assets, provide additional rolls of the dice, provide a bonus award, provide additional player selections, allow the player to continue game play after a game-terminating event has occurred, allow the player to use assets at a later gaming session, or allow a player to access new assets at a different gaming machine. The assets and modifiers can be shared by players at different gaming machines to influence the outcome of the wagering games and can be saved for use in subsequent gaming sessions.

25 Claims, 11 Drawing Sheets

U.S. PATENT DOCUMENTS

| | | | | |
|---|---|---|---|---|
| 6,364,765 | B1 | 4/2002 | Walker et al. | 463/16 |
| 6,365,765 | B1 | 4/2002 | Baldwin et al. | 556/440 |
| 6,431,983 | B2 | 8/2002 | Acres | 463/25 |
| 6,605,002 | B2 * | 8/2003 | Baerlocher | 463/25 |
| 6,758,757 | B2 | 7/2004 | Luciano, Jr. et al. | 463/43 |
| 6,776,713 | B2 | 8/2004 | Gauselmann | 463/16 |
| 6,800,027 | B2 | 10/2004 | Giobbi et al. | 463/24 |
| 6,811,486 | B1 * | 11/2004 | Luciano, Jr. | 463/24 |
| 6,923,721 | B2 | 8/2005 | Luciano et al. | 463/24 |
| 2001/0046893 | A1 | 11/2001 | Giobbi et al. | 463/24 |
| 2002/0077173 | A1 * | 6/2002 | Luciano et al. | 463/25 |
| 2002/0077174 | A1 | 6/2002 | Luciano et al. | 463/25 |
| 2002/0093136 | A1 | 7/2002 | Moody | 273/139 |
| 2002/0107065 | A1 | 8/2002 | Rowe | 463/20 |
| 2003/0013515 | A1 | 1/2003 | Rowe et al. | 463/25 |
| 2003/0013531 | A1 | 1/2003 | Rowe et al. | 463/42 |
| 2003/0036427 | A1 | 2/2003 | Brandstetter et al. | 463/29 |
| 2003/0078101 | A1 * | 4/2003 | Schneider et al. | 463/42 |
| 2003/0083943 | A1 * | 5/2003 | Adams et al. | 705/14 |
| 2003/0100362 | A1 | 5/2003 | Horniak et al. | 463/25 |
| 2003/0114219 | A1 | 6/2003 | McClintic | 463/25 |
| 2003/0157979 | A1 | 8/2003 | Cannon et al. | 463/16 |
| 2003/0189290 | A1 * | 10/2003 | Moody | 273/292 |
| 2003/0199309 | A1 * | 10/2003 | DeMar et al. | 463/20 |
| 2004/0142742 | A1 * | 7/2004 | Schneider et al. | 463/25 |
| 2004/0217546 | A1 * | 11/2004 | Gambrell | 273/244.1 |
| 2005/0170883 | A1 * | 8/2005 | Muskin | 463/25 |

* cited by examiner

WAGERING GAME HAVING RULE SET MODIFICATION

CROSS REFERENCE TO RELATED APPLICATION

This application claims the benefit of priority of U.S. Provisional Patent Application No. 60/632,238, filed Dec. 1, 2004, which is hereby incorporated by reference in its entirety.

FIELD OF THE INVENTION

The present invention relates generally to gaming machines and methods of playing wagering games at the gaming machines, and more particularly, to a gaming machine having a wagering game with modifiers to the basic set of rules of the wagering game.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to continuously develop new games, or improved gaming enhancements, which will attract frequent play through enhanced entertainment value to the player.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

However, even in current wagering games, a player is provided with little incentive to return to the game at a later time. Once the player chooses to stop playing a game, the player is immediately awarded any credits that are remaining and also loses assets that have been accumulated, but not yet awarded. For example, in some games, a player is allowed to collect assets and when a certain number or combination of assets is accumulated, the player wins an award. However, should the player choose to leave the game prior to winning the award, the player loses all of the assets accumulated. This can cause player frustration and does not provide the player with any incentive to return to the game.

Thus, there is a need to allow a player to accumulate assets at gaming machines and to have those assets restored to them should the player return to the game at a later time. Furthermore, there is a need to allow players to use such assets in a manner that encourages players to return to a particular game or series of games.

One way of keeping players interested and coming back to a particular game or series of games is to add various features to the games that make the games more exciting. These features can include offering increased awards, more game play and new and different ways to win. In particular, a feature that allows a player to use assets to get larger and/or extra awards at different gaming machines keep players interested and increases the probability that they will return at a later time.

For example, in the Monopoly™ board game wagering game, players are allowed to collect and save assets that can be used with that particular board game under a basic set of rules. Further enhancement of these games would provide modifiers to the basic set of rules that allow players to use such assets at other Monopoly™ board game wagering games, including games that are part of the series of Monopoly™ board game wagering games. In fact, some assets may only be used at particular Monopoly™ board game wagering games, so that players will be required to play other games to redeem those assets. This encourages players to play several Monopoly™ games in a series to find the ones that will give the most rewards for the assets that they have collected. Moreover, the modifiers to the basic set of rules may also allow players to gain extra rewards, extend game play, and enjoy other such enhancements, thus making game play more exciting.

Thus, the present invention increases the level of excitement and anticipation associated with playing wagering games, and thus encourages players to return to certain wagering games, by modifying the basic set of rules of the wagering game such that the assets that are collected and saved can be modified to enhance those assets, and the rewards associated with them, and to provide new assets that can be used at other gaming machines.

SUMMARY OF THE INVENTION

In one aspect of the present invention, a gaming machine for playing a wagering game includes a display for displaying a plurality of symbols that indicate a randomly selected outcome of the wagering game that has been selected from a plurality of outcomes in response to a wager input. Some of the outcomes include a plurality of assets that can be saved by a player for use during a subsequent gaming session. The wagering game has a basic set of rules for conducting the wagering game. The plurality of assets includes at least one rule-set-modifier asset that modifies the basic set of rules of the wagering game during the subsequent gaming session.

In another aspect of the present invention, a method of playing a wagering game includes conducting the wagering game at a gaming machine. The wagering game has a plurality of symbols that indicate a randomly selected outcome of the wagering game that has been selected from a plurality of outcomes in response to a wager input. Some of the outcomes include a plurality of assets that can be saved by a player for use during a subsequent gaming session. The plurality of assets include at least one rule-set-modifier asset. The method also includes providing a basic set of rules for conducting the wagering game and modifying the basic set of rules for conducting the wagering game with at least one rule-set-modifier asset.

In an alternative aspect of the present invention, a gaming machine for playing a wagering game includes a display for displaying at least one randomly selected outcome of the wagering game that has been selected from a plurality of outcomes in response to a wager input from a player. Some of the outcomes include a plurality of assets that can be saved by the player for use during a subsequent gaming session. The plurality of assets includes at least one rule-set-modifier asset. The gaming machine includes a controller coupled to the display. The controller operates to provide a basic set of rules for conducting the wagering game and to modify the basic set of rules of the wagering game via at least one of the rule-set-modifier assets.

In an alternative aspect of the present invention, a gaming machine for playing a wagering game includes a plurality of symbols that have a board game theme. The plurality of symbols indicates a randomly selected outcome of the wagering game. The randomly selected outcome is selected from a plurality of outcomes in response to a wager input from a player. Some of the outcomes include a plurality of assets that can be saved by a player for later use at a gaming session The gaming machine also includes a basic set of rules for conducting the wagering game and at least one rule-set-modifier asset that modifies the basic set of rules of the wagering game.

In an alternative aspect of the present invention, a method for conducting a wagering game includes receiving a wager input from a player for playing the wagering game. The wagering game has a basic set of rules for conducting the wagering game. The method includes selecting at least one randomly-selected outcome of the wagering game from a plurality of outcomes in response to receiving a wager input. Some of the plurality of outcomes include a plurality of assets associated with the board game that can be saved by the player during a gaming session to use at a later time. The method further includes modifying the basic set of rules of the wagering game through the selection of a rule-set-modifier asset.

In an alternative aspect of the present invention, a method for conducting a wagering game includes providing a plurality of gaming machines. Each gaming machine operates a wagering game that has a plurality of symbols that indicate a randomly selected outcome of the wagering game that has been selected from a plurality of outcomes in response to a wager input. At least one of the outcomes includes a rule-set-modifier asset that can be saved for use at a later time. The wagering game has a basic set of rules for conducting the wagering game. The method includes achieving the rule-set-modifier asset at a first gaming machine, transmitting data relating to the rule-set-modifier asset acquired at the first gaming machine to a memory device, receiving data relating to the rule-set-modifier asset acquired at the first gaming machine at a second gaming machine, and using the data relating to the rule-set-modifier asset acquired at the first gaming machine at the second gaming machine to modify the basic set of rules of the wagering game at the second gaming machine.

In an alternative aspect of the present invention, a gaming machine for playing a wagering game includes a basic game that has a plurality of symbols that indicate a randomly selected outcome of the basic game that has been selected from a plurality of outcomes in response to a wager input. One of the plurality of outcomes is a start-bonus-outcome that activates a bonus game. The bonus game includes a board game wherein a player travels along a predetermined path to acquire assets. Other of the plurality of outcomes include assets that can be saved by a player for use during a subsequent gaming session. The wagering game has a basic set of rules for conducting the basic game and the bonus game and at least one of the assets is a rule-set-modifier asset that modifies the basic set of rules.

In yet another alternative aspect of the present invention, a method for conducting a wagering game includes providing a wagering game at a gaming machine. The wagering game has a basic set of rules for conducting the wagering game. The method includes awarding a plurality of rule-set-modifier assets for modifying the basic set of rules for conducting the wagering game. The method further includes randomly selecting at least one of the rule-set-modifier assets in a subsequent gaming session.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
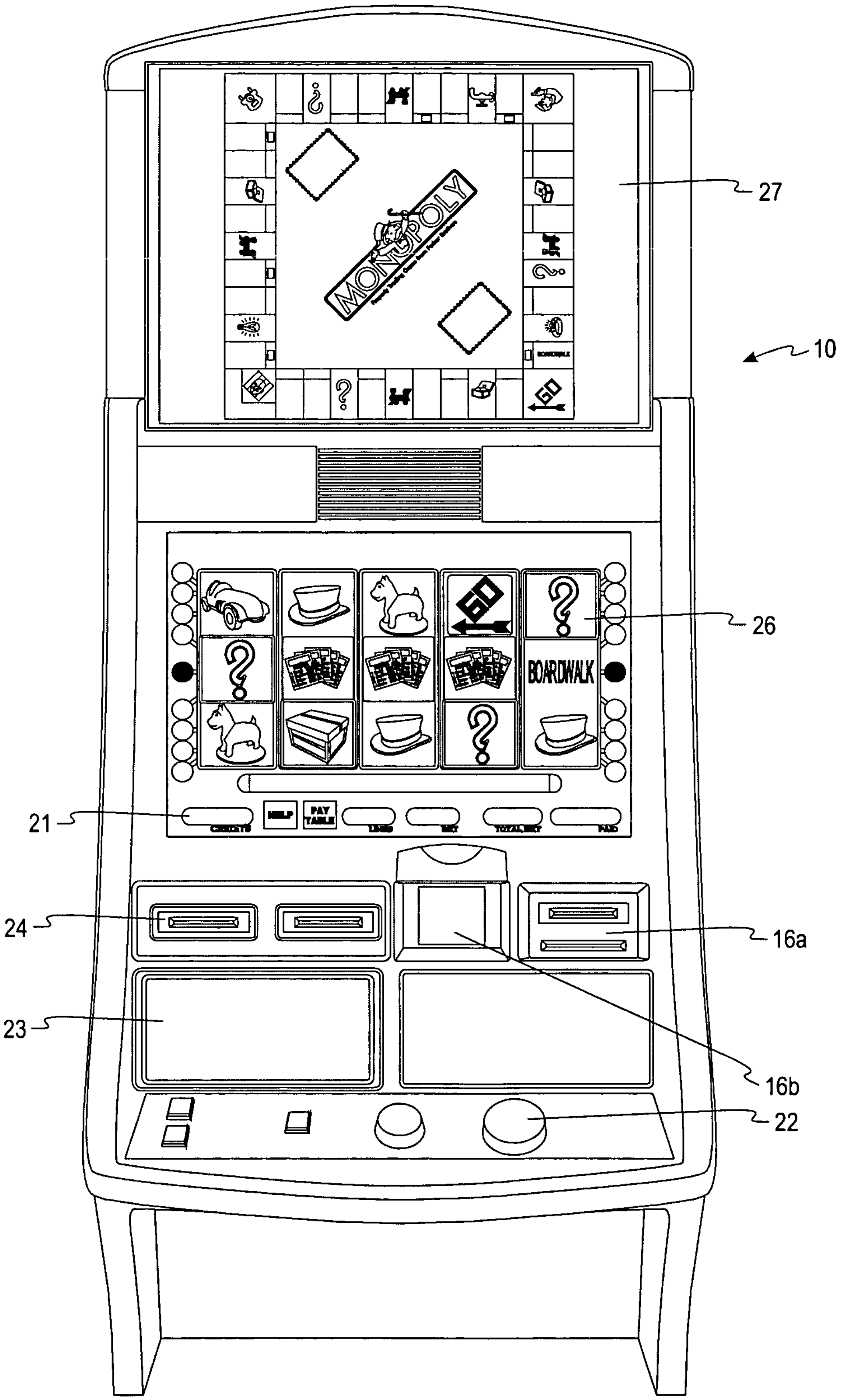
FIG. 1 is a perspective view of a gaming machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to a gaming machine and a method of playing a wagering game having a basic set of rules. The wagering game may have a board game theme, i.e., a Monopoly™ board game. Under the basic set of rules, a player can accumulate and save assets that are associated with the board game, such as cards, dice, tokens and properties. Other assets can include monetary awards, bonus rounds, extended game play, free spins, and other rewards. The accumulation of assets is affected by the randomly selected outcomes in the basic game. These outcomes are controlled by a processor or controller that performs random selections, thereby allowing the board game to be conducted as part of a wagering game. Once saved, the assets can be used in a subsequent gaming session at the same or different gaming machine.

Some of the assets of the wagering game include assets that modify the basic set of rules of the wagering game. These rule-set-modifier assets may enhance the assets already collected by a player or provide new assets to further increase the excitement level of the wagering game. For example, the rule-set-modifier assets may, inter alia, multiply an award associated with an asset or group of assets, provide additional rolls of the dice, provide a bonus award, provide additional player selections, allow the player to continue game play after a game-terminating event has occurred, allow the player to use assets at a later gaming session, or allow a player to access new assets at a different gaming machine. Additionally, the rule-set-modifier assets may be shared among players at different gaming machines and may be used in multiplayer games to affect the outcomes of games at different gaming machines.

FIG. 1 shows a perspective view of a typical gaming machine 10 used by gaming establishments, such as casinos. With regard to the present invention, the gaming machine 10 may be any type of gaming machine and may have varying structures and methods of operation. For example, the gaming machine 10 may be a mechanical gaming machine configured to play mechanical slots, or it may be an electromechanical or electrical gaming machine configured to play video slots or a video casino game, such as blackjack, slots, keno, poker, etc.

As shown, the gaming machine 10 includes input devices, such as a wager acceptor 16 (shown as a card wager acceptor 16*a* and a cash wager accepter 16*b*), a touch screen 21, a push-button panel 22, and an information reader 24. For outputs, the gaming machine 10 includes a payout mechanism 23, a main display 26 for displaying information about the basic wagering game, and a secondary display 27 that may display an electronic version of a pay table, information about a bonus game, and/or also possibly game-related information or other entertainment features. While these typical components found in the gaming machine 10 are described below, it should be understood that numerous other elements may exist and may be used in any number of combinations to create various forms of a gaming machine.

The wager acceptor 16 may be provided in many forms, individually or in combination. The cash wager acceptor 16*a* may include a coin slot acceptor or a note acceptor to input value to the gaming machine 10. The card wager acceptor 16*b* may include a card-reading device for reading a card that has a recorded monetary value with which it is associated. The card wager acceptor 16*b* may also receive a card that authorizes access to a central account, which can transfer money to the gaming machine 10.

Also included is the payout mechanism 23, which performs the reverse functions of the wager acceptor. For example, the payout mechanism 23 may include a coin dispenser or a note dispenser to output value from gaming machine 10. Also, the payout mechanism 23 may also be adapted to receive a card that authorizes the gaming machine to transfer credits from the gaming machine 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming machine 10. As shown, the main display 26 includes the touch screen 21 overlaying the entire display (or a portion thereof) to allow players to make game-related selections. Alternatively, the gaming machine 10 may have a number of mechanical reels to display the game outcome, as well. The secondary display 27 may display information relating to the basic wagering game or a bonus game. Like the main display 26, the secondary display 27 may take the form of a cathode ray tube (CRT), a high resolution LCD, a plasma display, LED, or any other type of video display suitable for use in the gaming machine 10.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming machine 10. The information reader 24 may also include a keypad (not shown) for entering a personal identification number (PIN). The gaming machine 10 may require that the player enter their PIN prior to obtaining information. The gaming machine 10 may use the secondary display 27 for providing the player with information about his or her account or other player-specific information. Also, in some embodiments, the information reader 24 may be used to restore assets that the player achieved during a previous game session and had saved.

Figure 2:
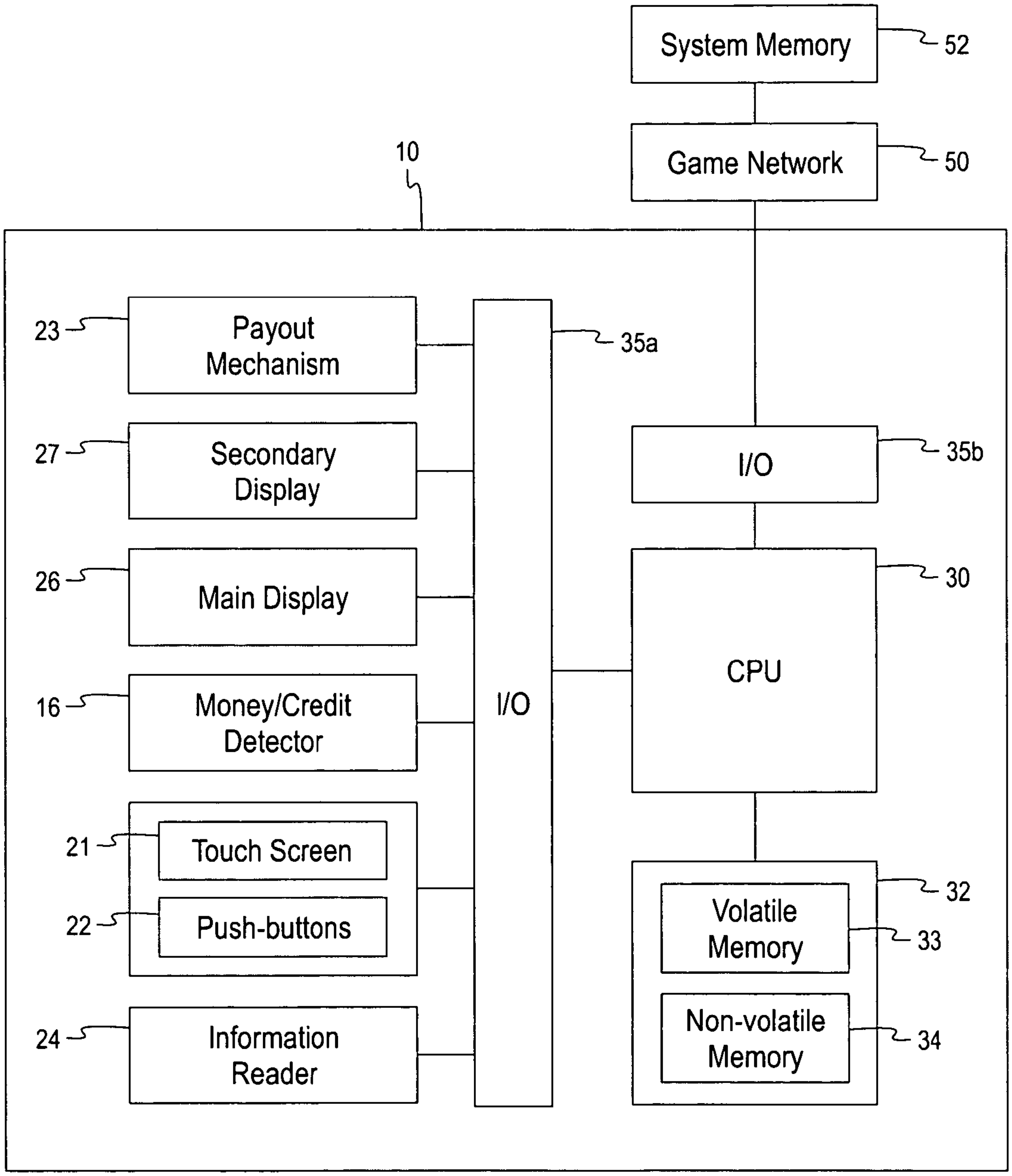
FIG. 2 is a block diagram of the gaming machine of FIG. 1.

As shown in FIG. 2, the various components of the gaming machine 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming machine 10 and the CPU 30 occur through input/output (I/O) circuits 35*a*. As such, the CPU 30 also controls and receives inputs from the peripheral components of the gaming machine 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming machine 10. Instead, the CPU 30 may be part of a game network 50 (FIG. 2) and may be used to control numerous gaming machines 10. In these embodiments, the CPU 30 will run the basic games for each of the gaming machines 10, and may also be used to link the gaming machines 10 together. The game network 50 can include progressive jackpots that are contributed to by all or some of the gaming machines 10 in the network (e.g., machine-level jackpots that only each machine 10 contributes to, bank-level jackpots that are contributed to by all of the machines 10 in a particular bank, and wide-area jackpots that are contributed to by a larger number of machines 10, such as multiple banks). Alternatively, the game network 50 can allow the player to retrieve assets obtained while playing at one gaming machine 10 at a different gaming machine that is also part of the game network. Assets may be any number of things, including, but not limited to, monetary or non-monetary awards, features that a player builds up in a bonus or progressive game to win awards, etc. Monetary awards can include game credits or money, while the non-monetary awards can be free plays (e.g., free spins), extended game play, multipliers, access to bonus and/or progressive games, or any such assets that allow players to receive additional or bonus awards, such as cards, dice, tokens or properties.

In some embodiments, the CPU 30 is also used with the information reader 24 to restore saved assets. For example, in one embodiment, the information reader 24 is adapted to receive and distribute tickets. The tickets each include a unique identifier. The unique identifier links the ticket to a file contained within the local memory 32 or a system memory 52 located in the game network 50. The file includes the assets that are being stored from a previous game.

When a player inserts a ticket into the information reader 24, the CPU 30 obtains the unique identifier and causes the appropriate memory 32, 52 to be searched, and the file containing the unique identifier matching the identifier on the ticket is retrieved. Any assets or other information contained in this file are then transmitted to the gaming machine 10, and the player regains any assets that were saved during a previous game. This allows the player to keep assets even after a particular gaming session ends, which increases player commitment to a game and decreases vulturing (and possibly even ends it).

In other embodiments, the information reader 24 may include a card reader, and the unique identifier provided at the gaming machine 10 may be stored on a personal identification card, such as one described above. Or, the gaming machine 10 includes a radio frequency identification device (RFID) transceiver or receiver so that an RFID transponder held by the player can be used to provide the unique identifier of the player at the gaming machine 10 without the need to insert a card into the gaming machine 10. RFID components can be those available from Pacific Northwest National Laboratory (under the United States Department of Energy) of Richland, Wash.

In some embodiments, the RFID may be embedded in a sticker that is placed on a card, such as the personal identification card, that can be inserted into the information reader 24. Alternatively, the RFID may be embedded in a gaming token. The gaming token may be plastic, metal or a combination thereof. The gaming token may be inserted into the wager accepter 16*a* or any other device that is capable of reading the RFID and identifying assets that a player has collected. The token may have certain features, some visible to the player and some not visible to the player, that relate to the wagering game.

In other embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming machine so that the player can be recognized using a voice recognition system.

In other embodiments, the player may simply have to enter in a unique identification code and password into the gaming machine 10. In these embodiments, the player would not have to insert a physical object (such as a card or ticket) into the gaming machine, but would instead use the information reader 24 as an input device, such as a keyboard.

In summary, there are many techniques in which to provide a unique identifier for the player so that the assets accumulated by the player during one wagering session can be stored in either the system memory 52 or local memory 32, thereby allowing the player to subsequently access those assets at the same gaming machine 10 or a different gaming machine within the network 50. Various assets related to the wagering game features and formats can be stored after one gaming session and used in a subsequent gaming session(s) to enhance the gaming experience for the player.

As has been discussed, the gaming machine 10 and/or associated gaming network 50 is capable of executing such wagering games on or through a controller. The controller, as used herein, comprises any combination of hardware, software, and/or firmware that may be disposed or resident inside and/or outside of a gaming machine 10 or like machine which may communicate with and/or control the transfer of data between the gaming machine and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller, as used herein, may comprise one or more controllers. In one implementation, each gaming machine 10 comprises, or is connected to, a controller enabling each gaming machine to transmit and/or receive signals, preferably both, in a peer-to-peer arrangement. In another example, the controller may be adapted to facilitate communication and/or data transfer for one or more gaming machines 10 in a client/server or centralized arrangement. In the one example, shown in FIG. 2, the controller in the gaming machine 10 comprises CPU 30 and the I/O circuits 35 (e.g., Network Interface Units) connecting the gaming machine 10 via a conventional I/O port and communication path (e.g. serial, parallel, IR, RC, 10bT, etc.) to the game network 50, which may include, for example, other gaming machines connected together in the network 50.

Figure 3:
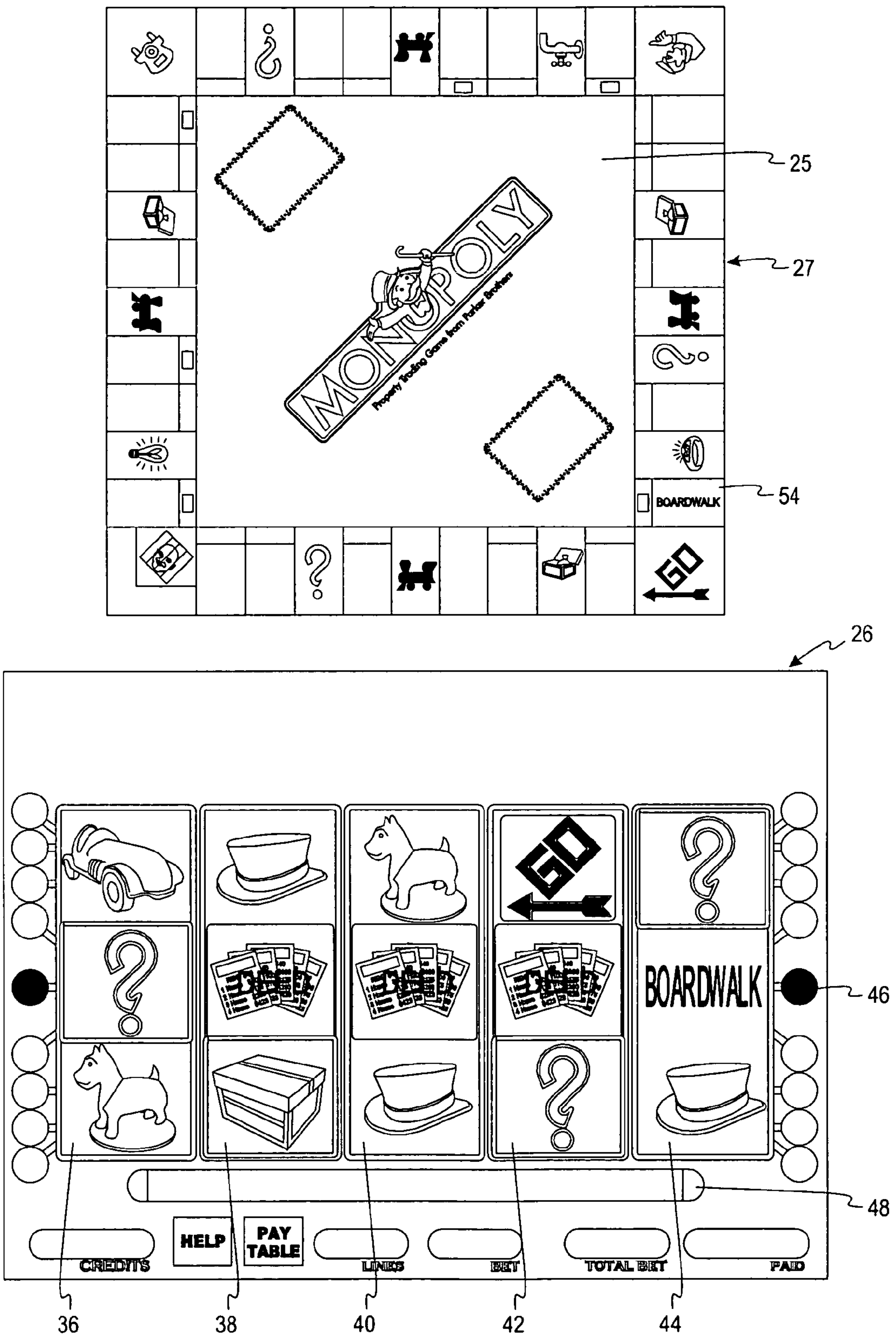
FIG. 3 illustrates a main and secondary display displaying a rule-set-modifier asset according to one embodiment of the present invention.

The main display 26 of one embodiment of the present invention is shown in more detail in FIG. 3. In this embodiment, the basic wagering game is a slot machine game, with symbols on five different reels 36, 38, 40, 42, 44. The reels 36-44 may be either traditional mechanical reels or they may be computer-generated images of reels, with each reel composed of a plurality of symbols. Upon receiving a wager input, the payline indicators 46 indicate a randomly selected outcome from a plurality of outcomes for each payline, which is the combination of symbols on the reels 36-44. Thereafter, an outcome indicator 48 indicates whether the outcome has resulted in a winning outcome or a non-winning outcome. While multiple paylines are shown, a gaming machine 10 with a single payline will also work with the present invention.

In one embodiment of the present invention, the wagering game includes a basic game that has a board game theme. The board game 25, as shown on the secondary display 27 of FIG. 3, is associated with different types of assets that can be collected by a player. The assets can include cards, dice, tokens, properties and other items associated with a board game. The assets can further include awards, bonus rounds, extended game play, free spins and other rewards. In this particular embodiment, a player travels along the predetermined path of the board game to acquire these assets. While the wagering game described herein and shown in the figures includes a game with a board game theme, the wagering game of the present invention may include any type of game that can be played at a gaming machine and is not limited to a game having a board game theme.

The wagering game has a basic set of rules that governs game play. Under the basic set of rules, a player is allowed to collect and save assets that can be used at a current or future gaming session. Some of the assets of the wagering game that can be collected and saved are assets that modify the basic set of rules of the wagering game. These rule-set-modifier assets may allow a player to earn increased awards associated with other assets or to access new assets that may be available at the same or different gaming machine. The rule-set-modifier assets may be shared among players at different gaming machines and may be used in multiplayer games to affect the outcomes of games at different gaming machines. Thus, by using rule-set-modifier assets to enhance assets, to access new and different assets at other gaming machines, and to share assets among players to influence the outcomes of wagering games at different gaming machines, it is intended that the wagering game of the present invention attracts players and encourages them to return to the same or other related wagering games.

In addition to the basic game, the wagering game can also include a bonus game as shown on the secondary display 27. The bonus game may have a basic set of rules for playing the bonus game. The bonus game may also have a board game theme that allows a player to travel along the predetermined path of the board game to acquire assets. A player accumulates assets to gain, among other things, credits, free plays, and/or access to a bonus game and a bonus award. The accumulation of assets is affected by the randomly selected outcome of the basic wagering game. The accumulated assets can be selectively stored by the player in a memory device for use in a later gaming session. One or more of the assets may be used by a player to modify the basic set of rules of the bonus game.

The wagering game, as depicted in FIG. 3, includes a board game 25 with a Monopoly™ theme. The symbols on the reels 38-44 display different assets that are related to the board game, i.e. property deeds, tokens, a community chest, chance, etc. The secondary display 27 also displays houses and/or hotels on certain properties. As shown in FIG. 3, under the basic set of rules, a player collects properties. For example, the "Boardwalk"™ property 54 has been collected, and the player is awarded a house and/or hotel on that property. Following the Monopoly™ theme, once a player collects a set of properties of the same color, he or she is given an award. Alternatively, a player may be given an award when he or she collects all properties on the Monopoly™ board.

Figure 4:
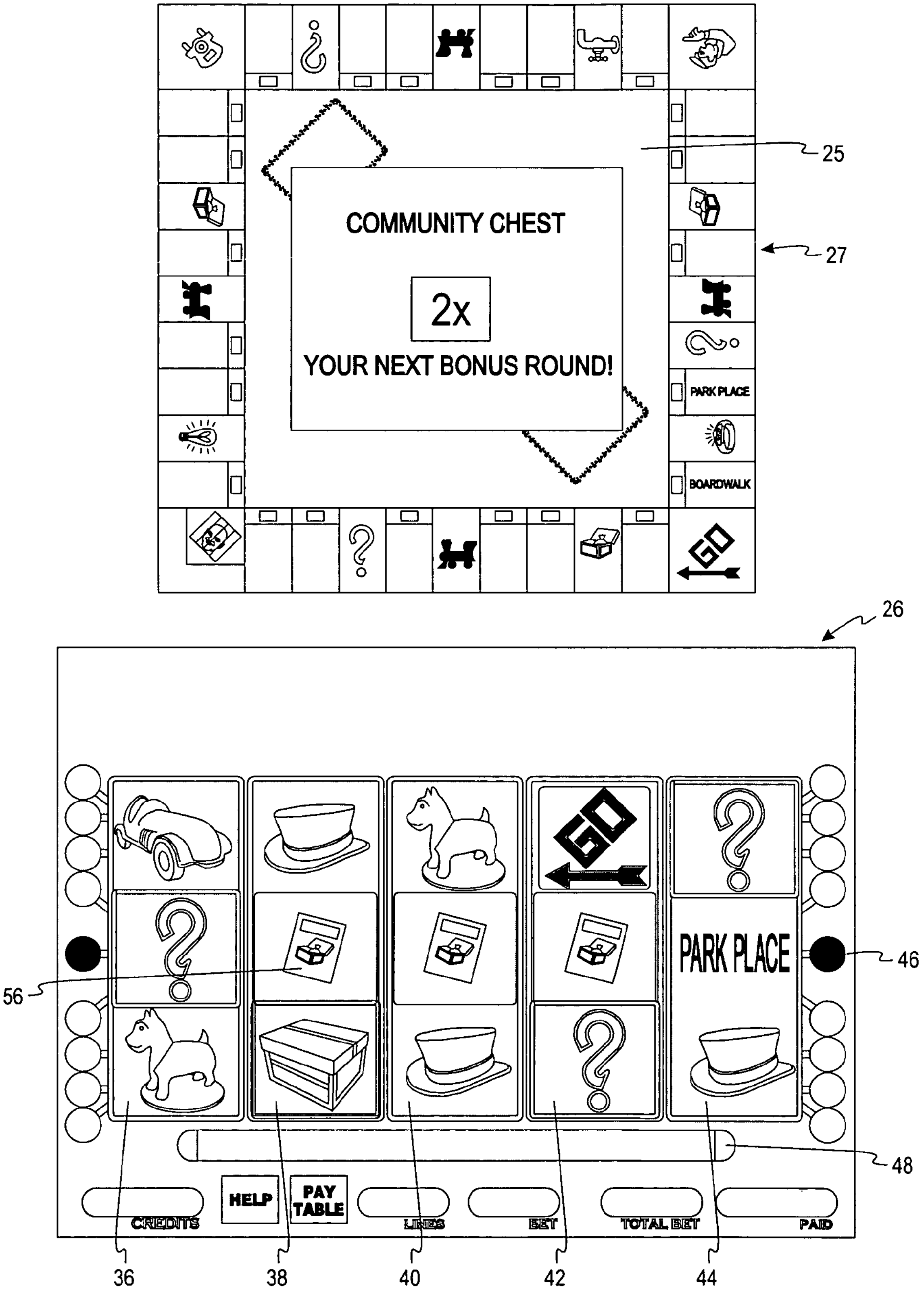
FIG. 4 illustrates a main and secondary display displaying a rule-set-modifier asset according to another embodiment of the present invention.

Once a player receives an award, he or she may be able to enhance the award or earn new awards via a modifier to the basic rules. The modifier may allow a player to multiply an award or other asset. One such modifier asset is shown in FIG. 4. The player has acquired a "Community Chest" multiplier in FIG. 4 by achieving three "Community Chest" symbols 56 along the center payline 46 on reels 38, 40, 42. This modifier asset allows a player to receive two times the player's next bonus round. This modifier asset can be used at the current gaming session, or if the player chooses, it can be saved and used at a later gaming session.

Figure 5:
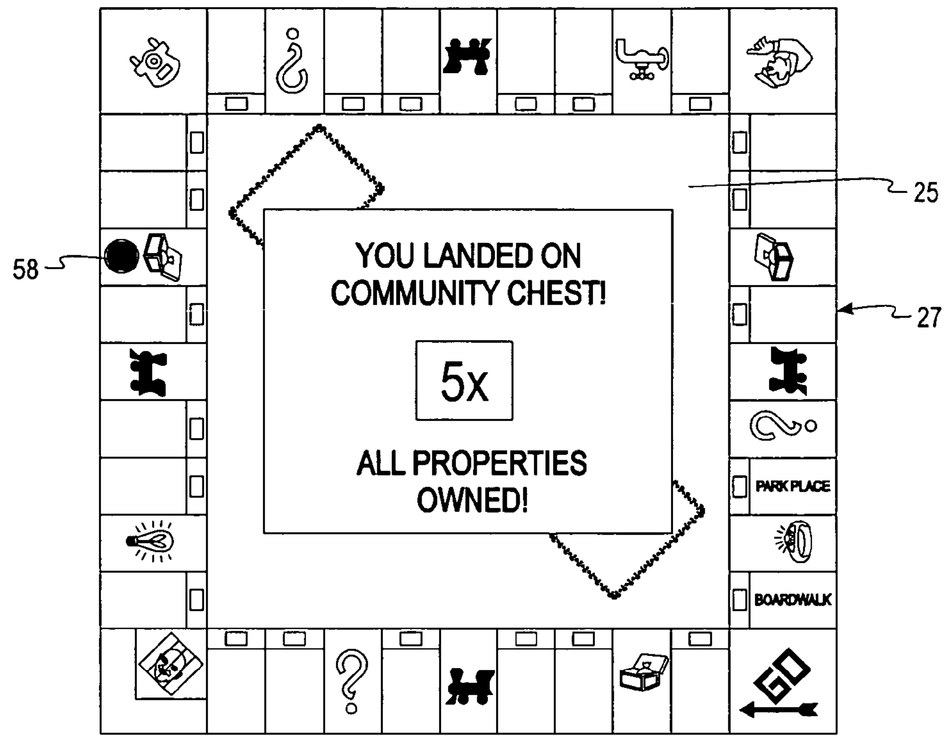
FIG. 5 illustrates a main and secondary display displaying a rule-set-modifier asset according to another embodiment of the present invention.
Figure 5:
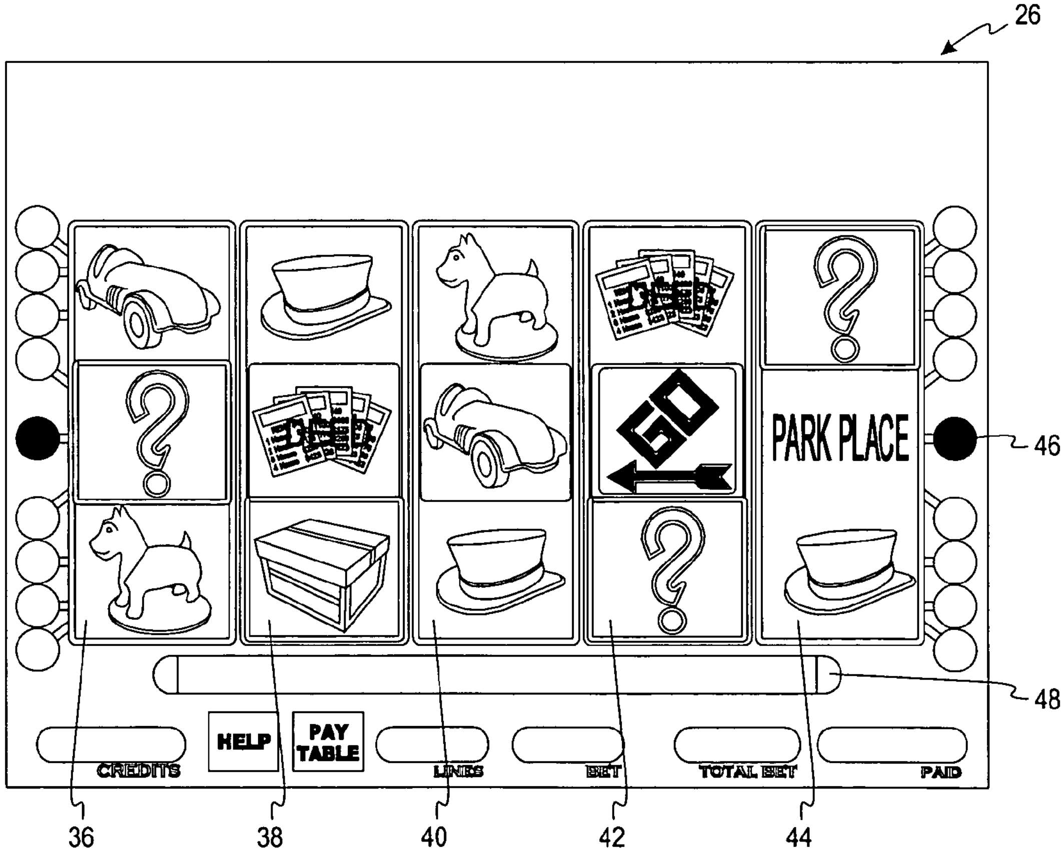

A player may also acquire a modifier asset to enhance an asset or group of assets based on an event not known to a player, i.e., a mystery event, or a certain event that is known to the player, i.e., landing on a space that provides a modifier asset. For example, as shown in FIG. 5, a player has landed his or her game token 58 on a "Community Chest" space on the Monopoly™ board 25 and has received a multiplier of five times all properties owned. This modifier asset can be used by the player when he or she first acquires it, or can be saved to use at a later time to multiply future assets owned by the player.

Thus, modifier assets can be used at the current or subsequent gaming sessions to modify current or future awards. Using a modifier asset at later gaming sessions may be advantageous to a player who only just began to play the wagering game, and has not yet acquired several properties. The player can continue to collect properties and then decide to use a modifier asset to maximize his or her winnings.

The wagering game may employ various mechanisms that allow a player to use a modifier asset. In one embodiment, a player can call up a list of all modifier assets that he or she has collected in his or her inventory and, from that list, select the modifier asset to be used. Some of these assets may be available to use at the current gaming session, while others may not. For example, some of the modifier assets may be used only at subsequent gaming sessions. In another embodiment, a player is allowed to "draw" a modifier asset, such as a card, from an active deck of cards. In this scenario, the player can use the randomly drawn card at the current gaming session or may be given the option of using the card at a later time. In a further embodiment, a player may have a "hand of cards" that have been drawn from a deck and which may be used at appropriate times during the gaming session.

Alternatively, the selection of the modifier asset that is to be used to modify an asset or group of assets may be determined by the controller, such as CPU 30, instead of the player. In this case, a controller randomly selects a modifier asset from the player's inventory, deck or hand and applies it to the assets to modify the asset or any awards associated with the asset. It is contemplated that some modifier assets may only be redeemed by random selection via the controller, while other modifier assets may be redeemed by either selection by the player or selection via the controller. It is also contemplated that some modifier assets may only be redeemed by a player.

Even though the examples given above suggest that the modifier assets are cards, it is contemplated that the modifier assets can also include tokens, tickets, reel symbols, or any other type of wagering game asset, either physical (such as a printed version of the asset via a game printer) or virtual (such as an icon or piece of art that is displayed in the wagering game).

In some embodiments of the present invention, a modifier asset may be removed from a player's available list of modifier assets once the modifier asset has been used. Alternatively, once used, some modifier assets have a unique attribute that allow them to be returned to a player's inventory for later reuse by the player at the current or subsequent gaming session. A player may also collect more than one of the same modifier asset.

In addition to modifying an award, the modifier asset may also provide additional rolls of a die or more than one die, a bonus award, or additional player selections. Modifier assets may also allow the player to continue game play after a game-terminating event has occurred, allow the player to use assets at a later gaming session, or allow a player to access new assets at a different gaming machine. These modifier assets are described in more detail in FIGS. 6-11.

Figure 6:
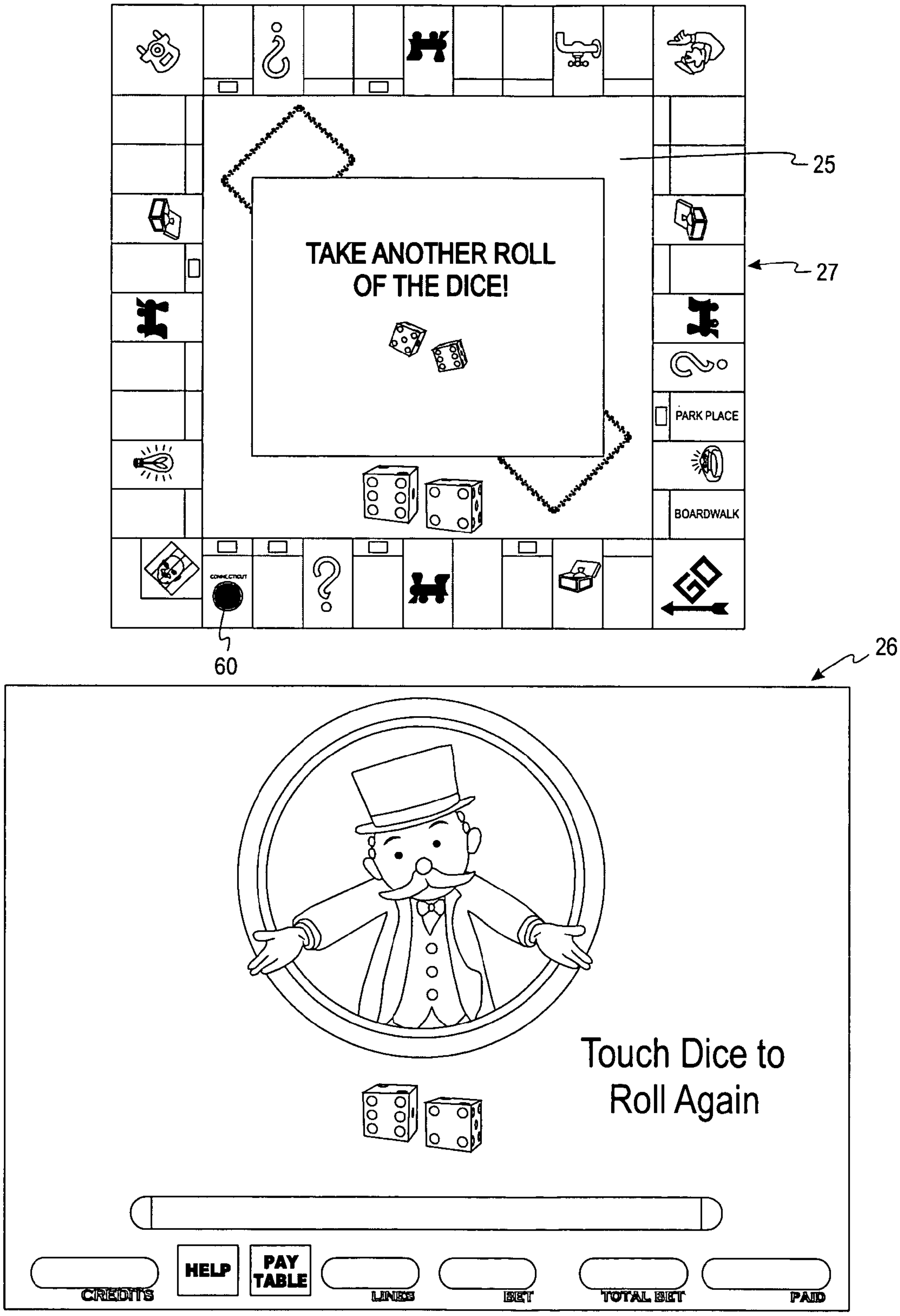
FIG. 6 illustrates a main and secondary display displaying a rule-set-modifier asset according to another embodiment of the present invention.

FIG. 6 illustrates a modifier asset that results from a mystery event. In this example, the player lands his or her game token 60 on the "Connecticut Avenue" space and is informed that he or she has been awarded an additional roll of the dice. This event is a mystery event as the player may not be aware that he or she has acquired this modifier asset until it is displayed on the secondary display 27. These mystery events further enhance the gaming experience because such events enhance a player's current inventory of assets without any additional input by the player and without the player knowing that achieving a certain outcome will produce such an event to occur.

Figure 7:
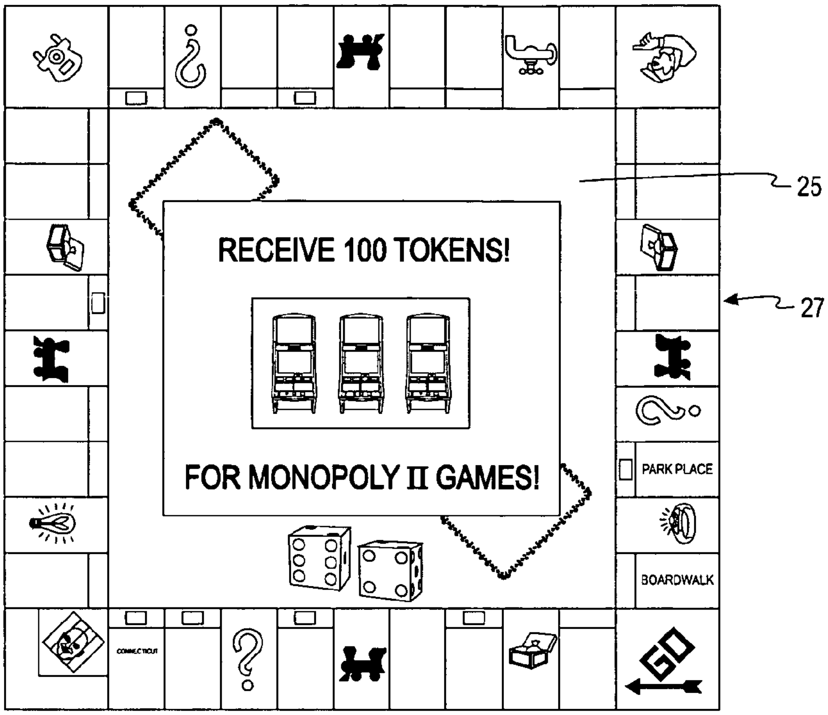
FIG. 7 illustrates a main and secondary display displaying a rule-set-modifier asset according to another embodiment of the present invention.
Figure 7:
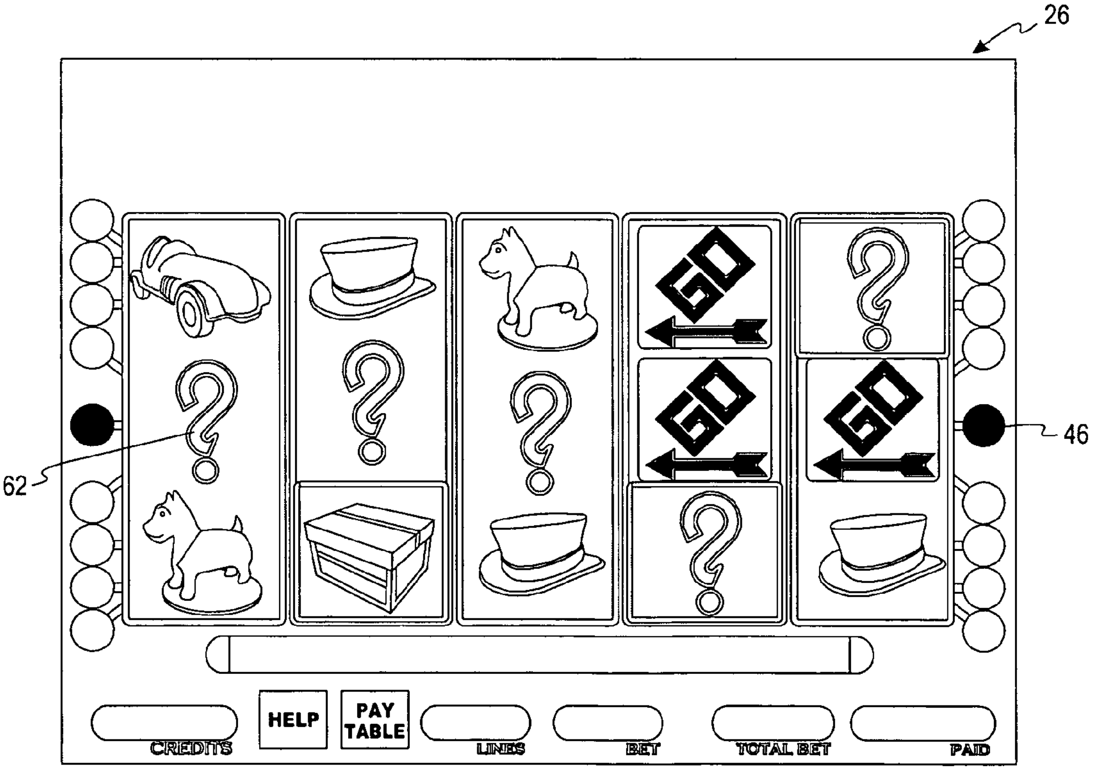

FIG. 7 illustrates another modifier asset in the form of an enhanced bonus award. In this example, a player has received three "Chance" ("?") symbols 62 in a row on the center payline 46. The player is informed that he or she has received 100 tokens to play Monopoly™ II games, i.e., a later version of the Monopoly™ game. The player can then redeem these tokens (or ticket containing the information that 100 tokens have been awarded) at a later gaming session. Alternatively, a player may receive tokens, or other free game play, that can only be used at gaming machines having earlier versions of the Monopoly™ board game. These types of modifier assets give players an incentive to play other games involving the Monopoly™ board game.

Figure 8:
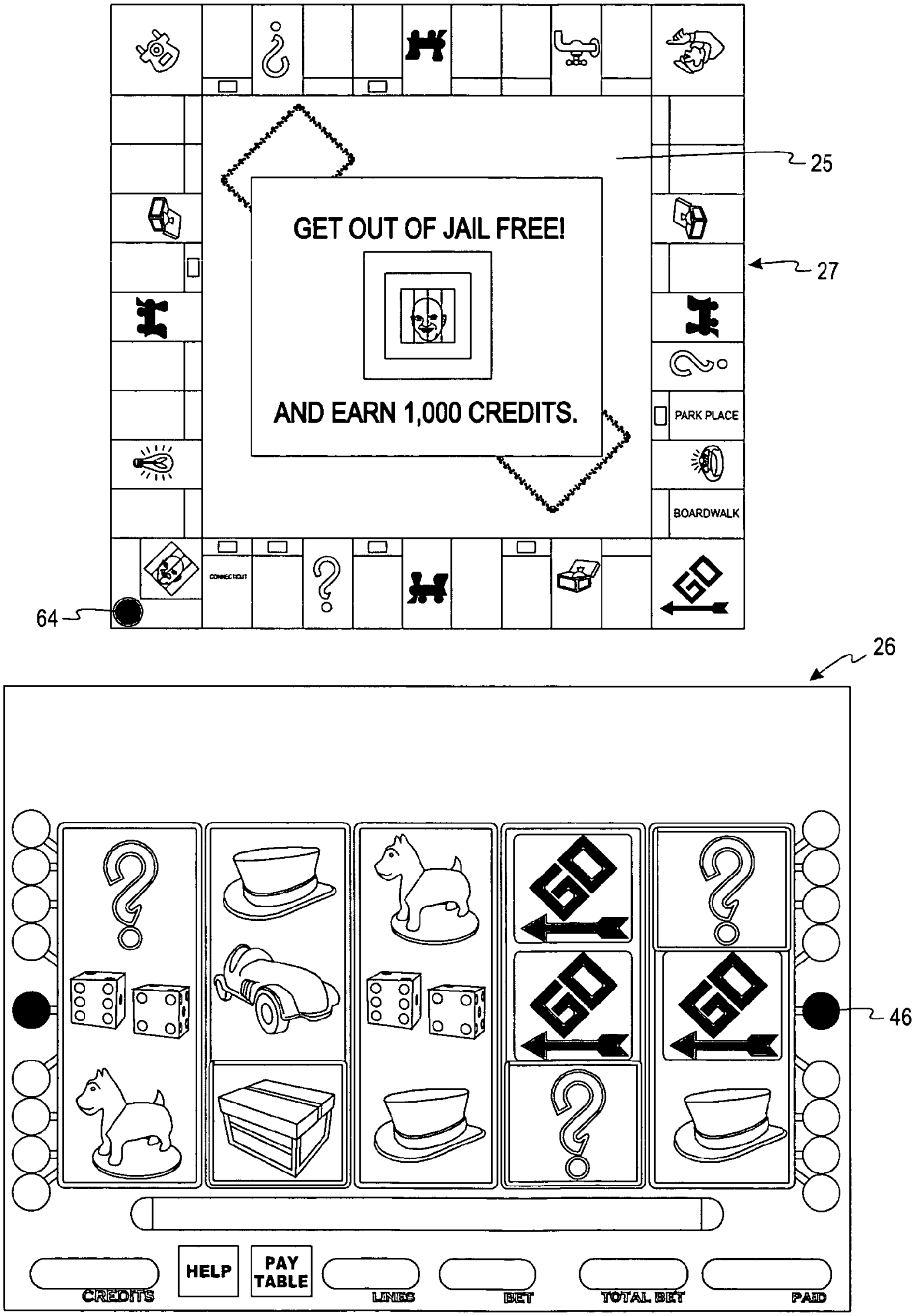
FIG. 8 illustrates a main and secondary display displaying a rule-set-modifier asset according to another embodiment of the present invention.
Figure 9:
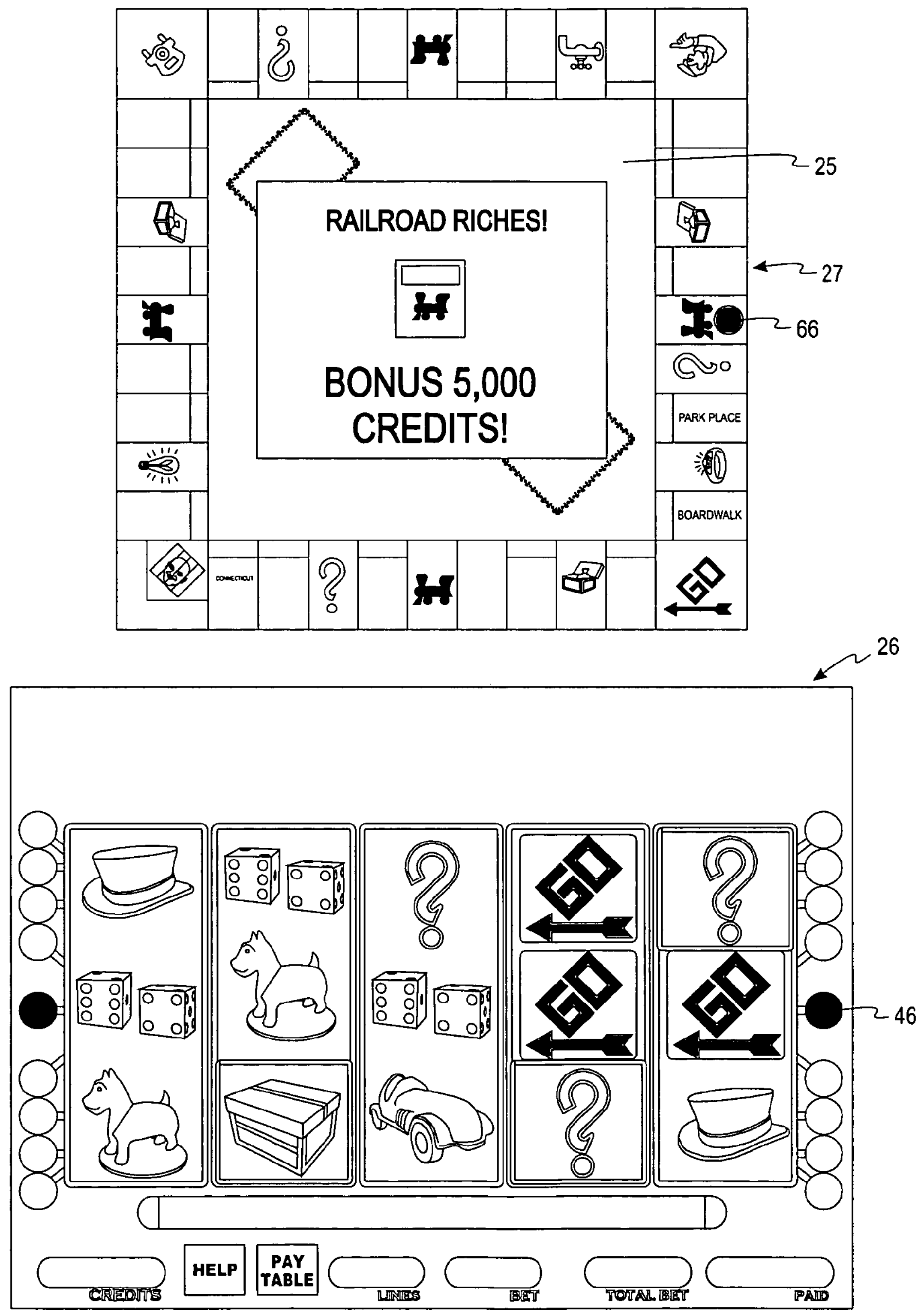
FIG. 9 illustrates a main and secondary display displaying a rule-set-modifier asset according to another embodiment of the present invention.

FIG. 8 illustrates another example of a modifier asset that provides a "Get Out of Jail Free" card and awards a certain number of credits. This modifier asset may be acquired by a player by landing his or her game token 64 on the "Jail" space on the Monopoly™ board 25. Similarly, upon a player landing his or her game token 66 on a "Railroad" space on the Monopoly™ board 25, a player acquires "Railroad Riches" and receives a bonus award of 5,000 credits, as shown in FIG. 9. These modifier assets may be redeemed during the current gaming session or a player may choose to redeem them at later gaming sessions.

Figure 10:
FIG. 10 illustrates a main and secondary display displaying a rule-set-modifier asset according to another embodiment of the present invention.
Figure 10:
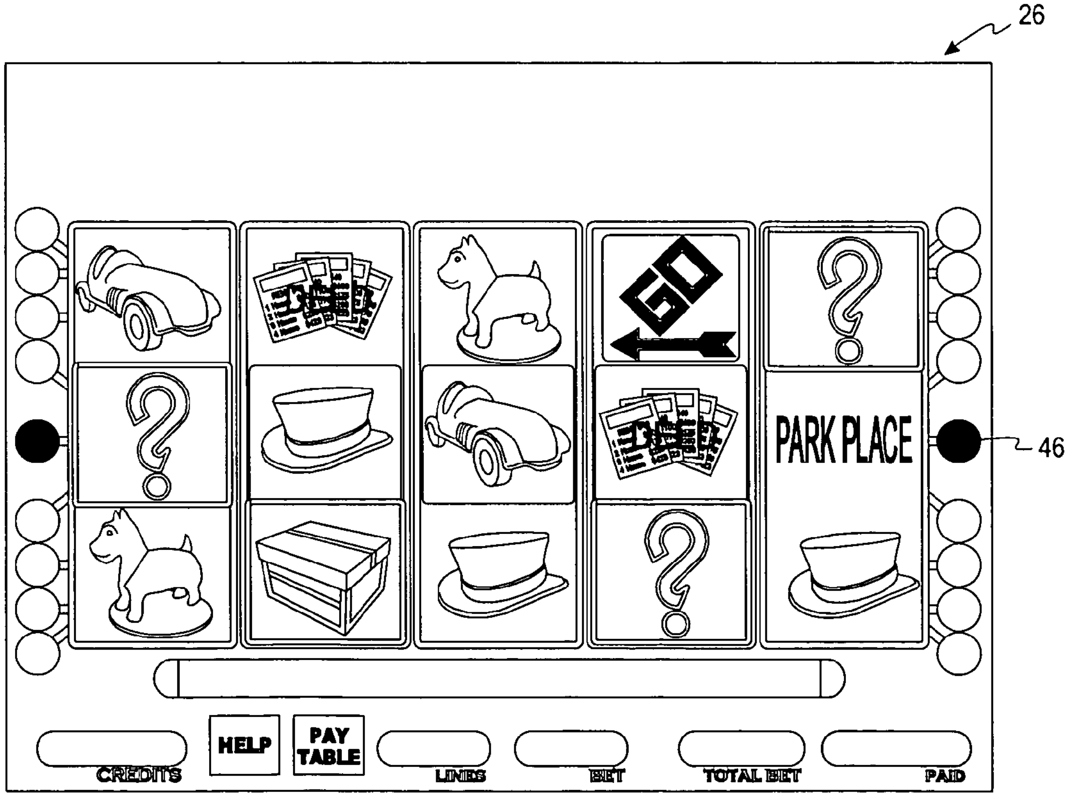
Figure 11:
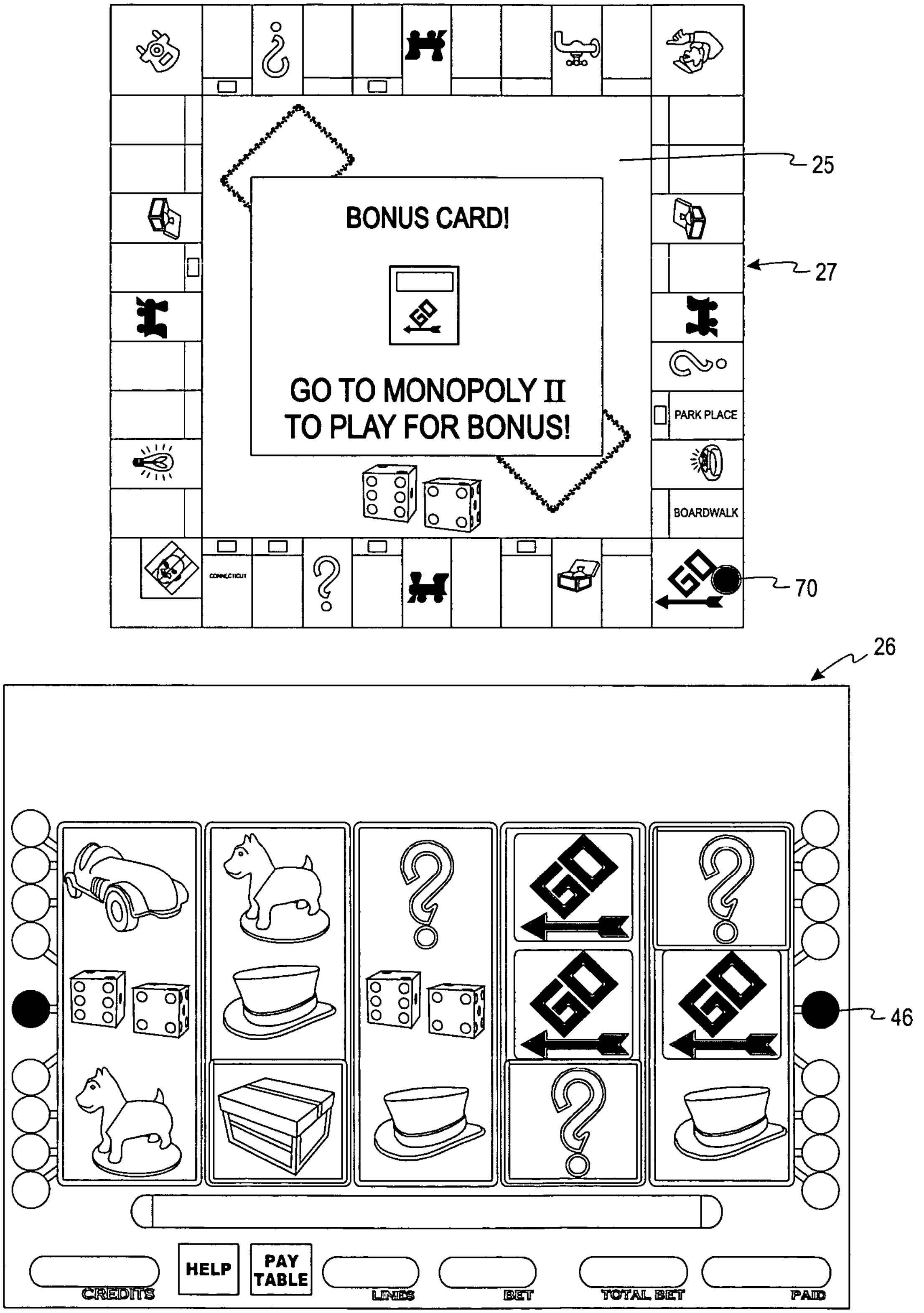
FIG. 11 illustrates a main and secondary display displaying a rule-set-modifier asset according to another embodiment of the present invention.

Other examples of modifier assets that enhance existing assets or provide new assets are illustrated in FIGS. 10 and 11. In FIG. 10, a player receives a modifier asset that provides a progressive award upon landing his or her token 68 on the "Free Parking" space on the Monopoly™ board 25. The progressive award may be saved for a later gaming session in the hopes of increasing the amount of the award. One example of a progressive game that can be used with respect to the present invention is described in U.S. Patent Application No. 60/502,762, entitled "Restricted Access Progressive Game for a Gaming Machine," assigned to WMS Gaming, Inc., and is incorporated by reference herein in its entirety.

FIG. 11, a player receives a modifier asset that provides a "Bonus Card." The "Bonus Card" that is acquired upon landing his or her game token 70 on the "GO" space on the Monopoly™ board 25 may be used at other Monopoly™ wagering games. The "Bonus Card" allows a player to access other assets or awards that may only be available at other Monopoly™ wagering games, and are only available as a result of having the "Bonus Card."

In other embodiments of the present invention, a modifier asset may be used to change the overall rule set of a bonus game, such as what events triggers a termination of the bonus game. For example, some bonus games end when a "pooper" selection occurs. By using a modifier asset, the rules of the bonus game may be changed such that the bonus game ends when a different game-terminating event occurs. One example of a different game-terminating event may be that the bonus game ends when the highest award in the bonus playfield is selected. The modifier asset may also be used to change the types of awards that a player can receive. As one example, instead of credits being awarded with each player selection, a range of free spins may be awarded.

In addition to the methods described above for collecting modifier assets, modifier assets may be collected by other means. For example, modifier assets may be collected in a secondary bonus event. In the secondary bonus event, bonus selections may reveal, in addition to the usual credit awards, a modifier asset. The modifier asset may be used to modify the credit awards from the secondary bonus event or may be saved to modify other bonus awards in the current or a later gaming session.

In other embodiments, players may be allowed to share modifier assets that they have acquired with another player or group of players. Thus, a player can choose to use a modifier asset that another player has acquired. In some cases, a player may be able to select the players that he or she wants to share with. Alternatively, the CPU 30 may select the players whose inventories are to be shared. In these embodiments, the players are able to be view each other's inventories and make selections to modify existing assets or acquire new assets. This sharing of the gaming experience provides players with additional incentive to return to play a particular game or series of games.

In addition to sharing modifier assets, other embodiments of the present invention may allow players to barter or exchange their modifier assets with each other. Bartering and/or exchanging may occur as players collect assets that other players may want in order to achieve certain outcomes. The bartering and/or exchanging may involve having players swap one modifier asset for another, offer credits or other awards for a modifier asset, or bid against other players to win modifier assets in an auction-style exchange.

In other embodiments involving multiplayer games, one player may have a modifier asset that affects another player's outcome or inventory of assets. For example, a player may collect a modifier asset, such as "Opponent loses a turn" or "Opponent loses a card from his/her inventory, deck or hand." In some embodiments, once an asset is "lost" by a player, the asset may be transferred to the player who used the modifier asset, i.e., the player who played the "lose an asset" card. Ownership of an asset may also be transferred by a modifier asset that specifically allows for such transfer, for example, via an "Opponent transfers a random or specific card to a player." In this case, the player may be able to choose the card or other asset that is transferred or the transfer may be based on a random selection performed by the controller. Alternatively, the asset that is "lost" to another player may be returned to the player's inventory, deck or hand at a later time.

In yet other embodiments, once a modifier asset has been used, it may not be available for use by another player. Thus, there may be advantages to using modifier assets before another player can use them. Alternatively, once a modifier asset is used by one player, it may not be available for use by that player again, but may be available for use by other players who have not used the modifier asset. This "single-play" alternative allows all players to benefit from the modifier assets acquired. Additionally, some modifier assets, once acquired, may be able to be used several times by any player. This encourages collaboration among players who are playing the Monopoly™ games, and based on this collaboration, increases the likelihood that prior players will return to play these games. Moreover, new players may be attracted to games where players are allowed to share assets since they have the benefit of having more experienced players contributing to their inventories.

For each of the embodiments described above, after a player decides to terminate play at the gaming machine, the assets can be stored by the player in the local memory 32 or system memory 52 (see FIG. 2), depending on the architecture and operation of the overall gaming system. The assets can then be restored for use in a subsequent gaming session by the player. The subsequent gaming session may be played at the same or a different gaming machine as the first gaming session.

In other embodiments, many gaming machines may be linked together for playing a wagering game that has a basic set of rules for conducting the wagering game. In these embodiments, the linked gaming machines may transmit and receive data relating to the wagering game. The data that is transmitted and received may include any type of assets, including modifier assets, that have been collected and saved by players at the linked gaming machines. The players may be able to use the modifier assets to modify the basic set of rules of the wagering game at a gaming machine during the same game or at a later gaming session at the same or different gaming machine.

In alternative embodiments, a player can use a telephone to access and use one or more of the player's accumulated game assets. For example, using a mobile phone, the player can dial a toll-free phone number to access his or her game assets. A central server associated with the network 50 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 10.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 10 while the player is physically at the gaming machine 10. Before the player walks away from the gaming machine 10, the player can register the gaming machine 10 to the player's phone. The player can also let the gaming machine 10 know what assets it may intend to use in the future via remote access by the phone. For example, the player can register the phone number as a password required to access the player's assets on the gaming machine 10. The player can initiate an auto-play feature while at the gaming machine 10 or remotely via the phone. The auto-play feature of the gaming machine 10 is configured to report, e.g., via still or moving images on the phone, one or more of the gaming outcomes. Then, at a later time, the player returns to the gaming machine 10, re-checks into the gaming machine via the phone and, optionally, cashes out any winnings. While no actual gameplay occurs on the phone, the phone is used for accessing the player's assets and gaming outcomes on the gaming machine 10.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 10 or a larger award if the player uses the telephone. In another example, the player may be given the option to play for smaller awards while the player is physically present at the gaming machine 10 or for larger awards if the player uses the telephone for gameplay initiation.

Alternative to using a voice telephone call to initiate a game or to access assets and/or awards, as described above, the player can send a text message. For example, the player can send a special code in the text message to log-in using a special number on the gaming machine 10.

For identification purposes, various verification ways can be used. For example, the player can enter the mobile telephone number into the gaming machine 10 as a player identification number. When the phone is near, the gaming machine 10 can detect it and verify the player identification number, e.g., the mobile number. For example, a receiver can be installed in the gaming machine 10 for detecting a mobile identifier (which may include the mobile number) that is periodically transmitted by mobile phones to the nearest mobile base station. Thus, the gaming machine 10 would have similar capabilities to the mobile base station.

Alternatively, the gaming machine 10 can send a voice or text message to the mobile telephone to verify the player's identification number. For example, the gaming machine 10 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y. Optionally, the special benefits can be made available based on the telephone model.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of playing a wagering game, comprising:

receiving a wager input via a wager acceptor at a first gaming machine;

in response to receiving said wager input, conducting said wagering game in a first gaming session at said first gaming machine according to a first set of rules, said wagering game including a basic game and a bonus game, said basic game having a plurality of symbols that indicate a randomly selected outcome of said wagering game that has been selected via a processor from a plurality of basic-game outcomes, said bonus game being triggered in said basic game and including a plurality of bonus-game outcomes, some of said basic-game outcomes and some of said bonus-game outcomes including a plurality of game assets that can be collected by a player and redeemed during a subsequent gaming session, said plurality of game assets including at least one rule-set-modifier asset, said plurality of game assets being independent of information pertaining to said player;

awarding said at least one rule-set-modifier asset during one of said basic game or said bonus game;

storing said at least one rule-set-modifier asset in a stored inventory;

terminating said first gaming session at said first gaming machine;

conducting said wagering game in a second gaming session at a second gaming machine according to said first set of rules;

applying said at least one rule-set-modifier asset stored in said stored inventory to said first set of rules to modify said first set of rules to create a second set of rules wherein said applying is independent of information pertaining to said player; and after said applying, conducting said wagering game in said second gaming session at said second gaming machine according to said second set of rules, said second set of rules being distinct from said first set of rules.

2. The method of claim 1, wherein said at least one rule-set-modifier asset is a plurality of rule-set-modifier assets; and wherein said applying said at least one rule-set-modifier asset includes randomly selecting via said processor one of said plurality of rule-set-modifier assets to create said second set of rules.

3. The method of claim 1, further comprising removing said rule-set-modifier asset from said player's stored inventory once said rule-set-modifier asset has been applied.

4. A method of playing a wagering game, said wagering game including a plurality of possible randomly-selected game outcomes and a standard set of game rules for conducting said wagering game, said method comprising:

receiving a first wager input via a first wager acceptor at a first gaming machine;

in response to said receiving said first wager input, displaying on a first display device said wagering game to a first player at said first gaming machine in a first gaming session;

while conducting said wagering game at said first gaming machine in said first gaming session, awarding to said first player of said wagering game a rule-modifier asset included within one or more of said game outcomes, said rule-modifier asset being based on said wagering game and being independent of information pertaining to said first player;

receiving a second wager input via a second wager acceptor at a second gaming machine;

in response to said receiving said second wager input, displaying on a second display device said wagering game to a second player at said second gaming machine in a second gaming session;

while conducting said wagering game at said first or said second gaming machine, transferring said rule-modifier asset awarded to said first player to an account associated with said second player, said account associated with said second player being distinct from said account associated with said first player; and allowing said second player of said wagering game to redeem, at said second gaming machine in said second gaming session, said transferred rule-modifier asset awarded in said first gaming session, said rule-modifier asset modifying said standard set of game rules independent of information pertaining to said first and second players.

5. The method of claim 4, further comprising storing, during said first gaming session, said awarded rule-modifier asset in an account associated with said first player, and accessing, during said second gaming session, said stored rule-modifier asset from said account associated with said second player.

6. The method of claim 5, further comprising returning said rule-modifier asset to said account associated with said second player after redeeming in said second session.

7. The method of claim 4, wherein said rule-modifier asset enhances an award earned by said second player.

8. The method of claim 4, wherein said rule-modifier asset changes the type of awards said second player can receive.

9. The method of claim 4, wherein said redeeming includes selecting said rule-modifier asset from a list of rule-modifier assets.

10. The method of claim 4, wherein said rule-modifier asset includes a multiplier, an additional roll of at least one die, a bonus award, a bonus game, additional player selections, extended game play and continued game play after a game-terminating outcome is achieved.

11. The method of claim 1, wherein a rule-set-modifier asset awarded during said basic game is different from a rule-set-modifier asset awarded during said bonus game.

12. The method of claim 1, wherein a rule-set-modifier asset awarded during said basic game is the same as a rule-set-modifier asset awarded during said bonus game.

13. The method of claim 1, wherein a rule-set-modifier asset awarded during said basic game is only applicable during play of said basic game.

14. The method of claim 1, wherein a rule-set-modifier asset awarded during said basic game is applicable during play of said basic game or during play of said bonus game.

15. The method of claim 1, wherein a rule-set-modifier asset awarded during said bonus game is only applicable during play of said bonus game.

16. The method of claim 1, wherein a rule-set-modifier asset awarded during said bonus game is applicable during play of said basic game or during play of said bonus game.

17. A method of playing a wagering game, comprising:

conducting said wagering game via one or more processors at a gaming machine in accordance with a basic set of rules, said wagering game including a basic game and a bonus game;

awarding, using one of said one or more processors, a first rule-set-modifier asset during play of said basic game;

storing said first rule-set-modifier asset in a stored inventory;

in response to a triggering event in said basic game, playing said bonus game;

awarding, using one of said one or more processors, a second rule-set-modifier asset during play of said bonus game;

storing said second rule-set-modifier asset in said stored inventory; and modifying said basic set of rules for conducting said wagering game with at least one of said first and said second rule-set-modifier assets stored in said stored inventory, wherein said modifying is independent of information pertaining to said player.

18. The method of claim 17, wherein said at least one rule-set-modifier asset awarded during said basic game is different from said at least one rule-set-modifier asset awarded during said bonus game.

19. The method of claim 17, wherein said at least one rule-set-modifier asset awarded during said basic game is only redeemable is said basic game and said at least one rule-set-modifier asset awarded during said bonus game is only redeemable is said bonus game.

20. The method of claim 17, further comprising redeeming one of said awarded rule-set-modifier assets awarded in response to a player selection.

21. The method of claim 17, further comprising redeeming one of said awarded rule-set-modifier assets in response to a selection by a controller associated with said gaming machine.

22. A method of playing a wagering game, comprising:

conducting a first session of said wagering game at a gaming machine, said wagering game having a plurality of symbols configured to indicate a plurality of outcomes of said wagering game, at least one of said outcomes awarding a first type of game asset and another one of said outcomes awarding a second type of game asset, said first and said second types of game assets being collected by a player and redeemed during a subsequent gaming session;

awarding a plurality of said first type of game assets, said first type of game assets-being redeemable by said player;

awarding a plurality of said second type of game assets, said second type of game assets being applied to said wagering game based on a selection from a controller associated with said gaming machine;

saving said awarded first type of game assets and said awarded second type of game assets to a stored inventory;

terminating said first session of said wagering game at said gaming machine;

conducting said subsequent session of said wagering game;

redeeming one of said first type of game assets saved in said stored inventory in response to a player selection; and redeeming one of said second type of game assets saved in said stored inventory in response to said selection by said controller.

23. The method of claim 22, wherein said redeeming one of said second type of game assets saved in said stored inventory includes (i) receiving a player selection only of a time to apply one of said second type of game assets saved in said stored inventory and (ii) selecting, via said controller, one of said second type of game assets to be applied to said wagering game without further player input.

24. The method of claim 22, wherein said first type of game assets are only redeemable by said player and said second type of game assets are only redeemable by said controller.

25. The method of claim 22, further including conducting said wagering game with one of said first and second types of game assets being applied to said wagering game.

* * * * *